Figure 1:
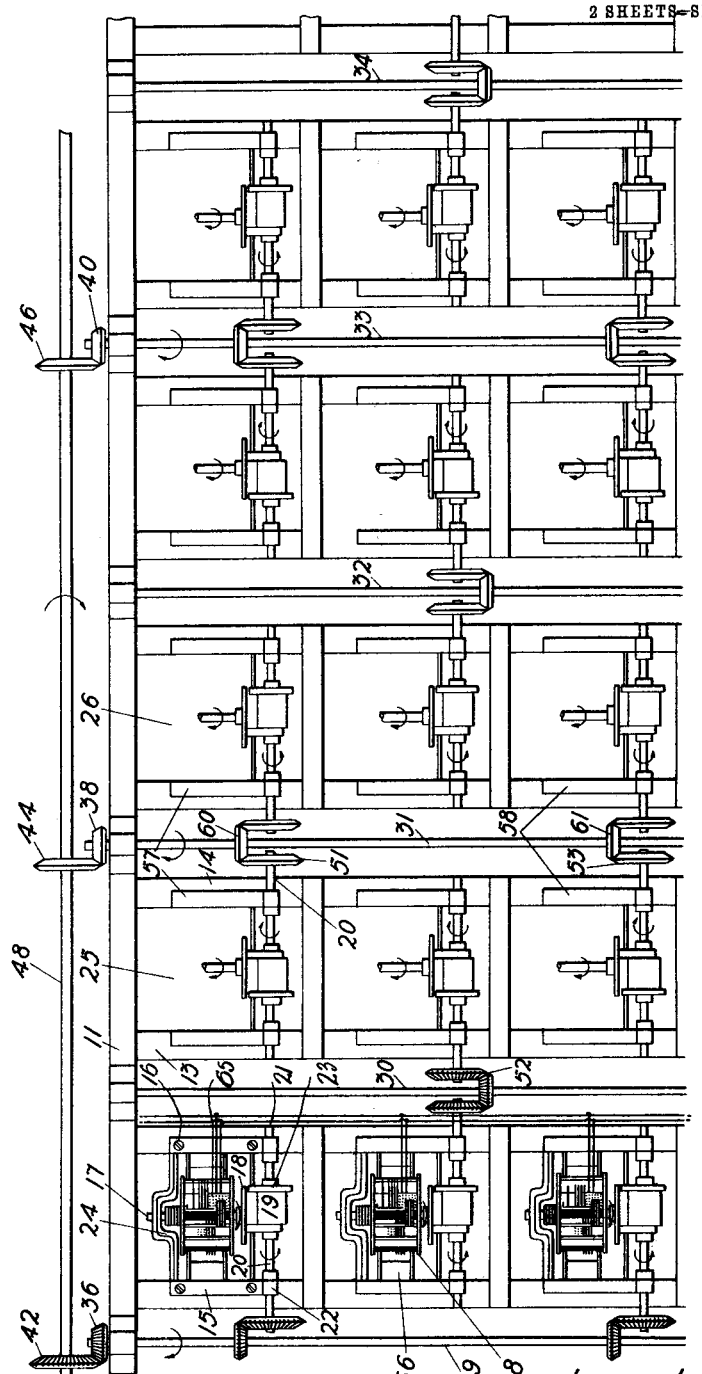

F. R. McBERTY.
POWER SYSTEM FOR AUTOMATIC SWITCHES.
APPLICATION FILED AUG. 21, 1913.

1,126,804.

Patented Feb. 2, 1915.

2 SHEETS—SHEET 1.

Witnesses:

Inventor:
Frank R. McBerty
by ⎯⎯⎯⎯ Att'y

F. R. McBERTY.
POWER SYSTEM FOR AUTOMATIC SWITCHES.
APPLICATION FILED AUG. 21, 1913.
1,126,804.
Patented Feb. 2, 1915.
2 SHEETS—SHEET 2.
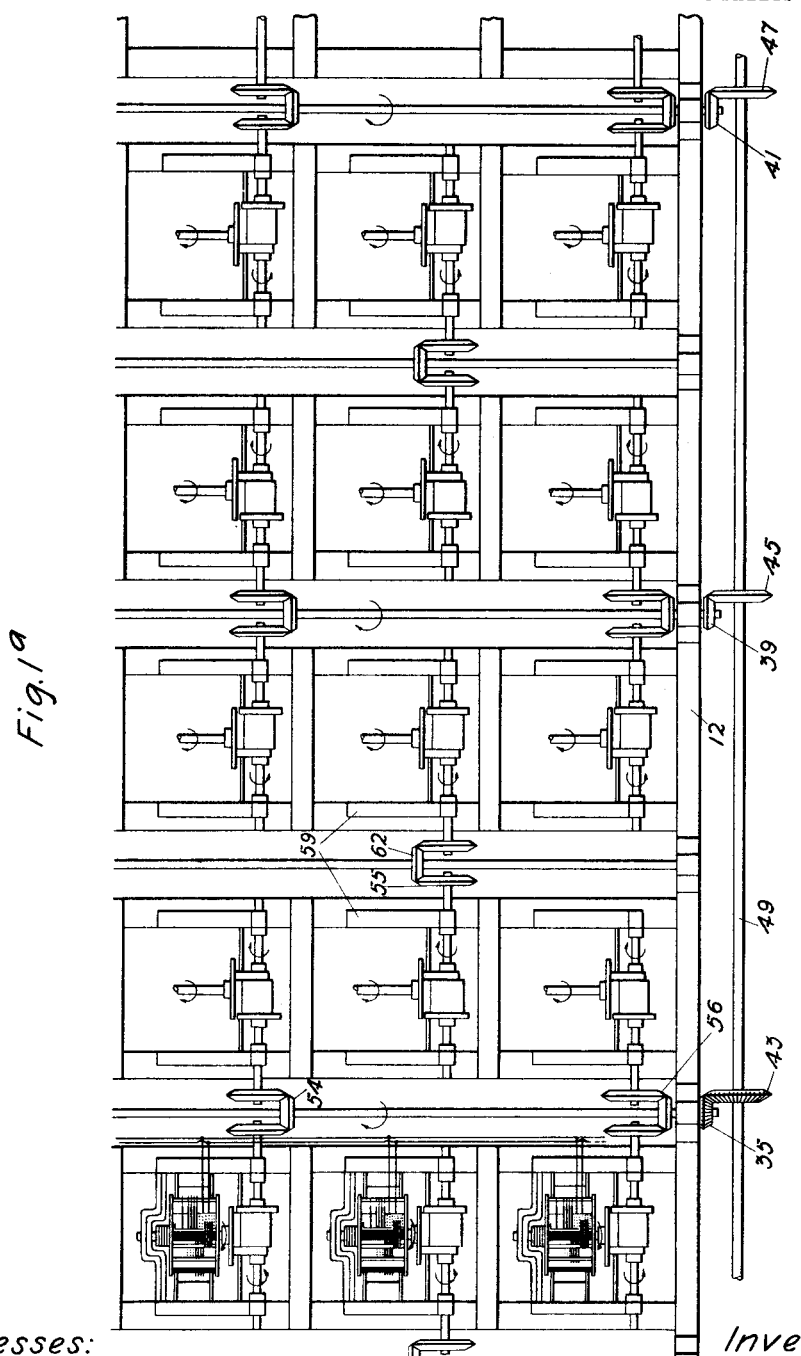
Witnesses:
Inventor:
Frank R. McBerty.
by _____ Atty.

UNITED STATES PATENT OFFICE.

FRANK ROBERT McBERTY, OF ANTWERP, BELGIUM, ASSIGNOR TO WESTERN ELECTRIC COMPANY, OF NEW YORK, N. Y., A CORPORATION OF ILLINOIS.

POWER SYSTEM FOR AUTOMATIC SWITCHES.

1,126,804.        Specification of Letters Patent.        Patented Feb. 2, 1915.

Application filed August 21, 1913. Serial No. 785,871.

*To all whom it may concern:*

Be it known that I, FRANK ROBERT MC-BERTY, a citizen of the United States, residing at 49 Boulevard Leopold, Antwerp, Belgium, have invented certain new and useful Improvements in Power Systems for Automatic Switches, of which the following is a full, clear, concise, and exact description.

This invention relates to telephone exchange systems employing power-driven automatic switches, and particularly to systems of the character in which the lines are divided into groups, each group being served by a plurality of switches to each of which the lines of the group are multiplied, the several switches being provided with clutches by means of which they are coupled to and uncoupled from the driving shaft.

There are certain periods of time in telephone exchanges when the amount of traffic diminishes to a point where but a portion of the switches of each group is necessary to handle the calls thereof, as for example at times during the night.

One of the features of this invention therefore is to provide a switch driving arrangement wherein a portion of the switches of any or all the groups may be readily and conveniently rendered inoperative, the calls being then concentrated on but a portion of the normal number of switches.

A further feature of the invention is to reduce the liability of the subscribers of any given group or of the exchange being entirely without service due to derangement of the power mechanism.

To these ends the invention contemplates an improved switch driving arrangement wherein some of the switches of each group are driven from one power shaft and the others from another but equivalent power shaft these shafts being driven from entirely independent sources of power.

In the form of the invention shown in the accompanying drawings the switches are arranged in vertical bays, each bay containing the terminals of a group of lines multipled to the switches by vertical cabling. The switches indicated are of the type described in British specification No. 16,151 of 1912 but it will of course be understood that the invention is not limited to systems using this type of switch wholly or in part. According to the arrangement shown, driving shafts are located between the bays, each succeeding shaft being driven by a different power source and a portion of the group of switches located between any two shafts being driven from one of said shafts and the remainder from the other.

In the drawings, Figures 1 and 1ª together represent banks of switches, and the lines indicating the frame members and shafts which terminate at the bottom of Fig. 1 are continued at the top of Fig. 1ª.

Referring to the drawings, 11 and 12 designate horizontal members of a metallic framework and 13, 14 the vertical members thereof. Each pair of vertical members 13, 14 forms a support for a group of automatic switches, the frames 15 of the switches being secured by screws 16 to the vertical members 13, 14.

Only enough of the switch structure is shown herein to give a clear idea of the mode of operation thereof. The spindle of the switch is designated 17 and has attached to its lower end an elastically mounted metallic disk 18 which serves to complete the magnetic circuit of a magnet 19 of which a portion of the shaft 20 having bearings 21, 22, in the frame of the switch, forms the core. A disk 23 of magnetizable material rotates with the shaft 20; the magnet 19, however, is stationary. Each vertical series or group of switches 24, 25, 26, etc. may be called a bay, each bay as 25 being located between two driving shafts 30, 31 having bearings in the horizontal members 11, 12. Each alternate driving shaft as 29, 31, 33 has a gear wheel 36, 38, 40 at its upper end meshing with a gear wheel 42, 44, 46 etc. respectively of a shaft 48 arranged at right angles thereto, above the framework, and each alternate shaft 30, 32, 34, etc. has a gear wheel 35, 39, 41 at its lower end meshing with a gear wheel 43, 45, 47, etc., respectively of a shaft 49 arranged at right angles to said shaft below the framework. The shafts 48, 49 are driven from different sources of power; for example each may be driven by an electric motor.

Fixed to one end of the shaft 20 of each of the automatic switches is a gear wheel such as 51, the gear wheels 51, 53, 55 of alternate switches of the bay 25 for example being driven from the shaft 31 and the gear wheels 52, 54, 56 of the remaining switches of the bay 25 being driven from the shaft 30. It will be noted that the gear wheels of every alternate pair of switches located in adjacent levels, as 57, 58, 59, are driven from the same gears, as 60, 61, 62.

It will be observed that the driving disks 23 of the switches of the first, third and fifth bays are located on their shafts 20 to the right of the driving magnets 19 while the driving disks 23 of the second, fourth and sixth are located on the left hand side of the driving magnets. This is for the purpose of having all the brush carriages rotate in the same direction.

The terminals 65 of the bays are multiplied in accordance with a system known as "vertical cabling," fully described in British Patent No. 16868 of 1911. The multiplying of the first bay only is shown in full. Each bay as shown contains six finder switches multiplied according to this method, each switch containing sixty fixed sets of three terminals each arranged in three rows of twenty each. These bays are made up in units, each consisting of six selector switch frames 66 carrying the fixed line terminals 65 and the banks of insulation wherein they are embedded, and the multiple cabling. These units are attached by screws (not shown) to the rear of the vertical members 13, 14. The moving parts of each switch and the actuating parts thereof consisting of the brush carriage 68, the driving magnet 19 and the shaft 20 are mounted upon the frames 15.

From what has been said it is apparent that by virtue of this invention a portion of the switches of a structure made up in unit form, each unit serving a particular line group may be rendered inoperative without modifying in any way the unit, and also that the likelihood of any group of subscribers being entirely without service due to derangement of the power mechanism is greatly reduced.

Having now particularly described and ascertained the nature of my said invention and in what manner the same is to be performed, I declare that what I claim is:—

1. In a telephone exchange system, the combination with a plurality of lines divided into groups, of a group of automatic switches for each line group, different sources of power, and means for driving alternate switches of each group from different sources.

2. In a telephone exchange system, the combination with a plurality of lines divided into groups, of automatic selector switches for each line group to which such lines are multiplied, shafts driven from different sources of power arranged in operative relation to each group, and means for coupling alternate switches serving any line group to different shafts.

3. In a telephone exchange system, the combination with a plurality of lines arranged in groups, of a row of automatic selector switches for each line group to which such lines are multiplied, a driving shaft between each row or bay of switches, two power shafts driven from different sources, the switches located in a given bay being located between shafts driven one from each of said power shafts, and some of the switches thereof being driven from one shaft and some from the other.

4. In a telephone exchange system, the combination with a plurality of lines arranged in groups, of a vertical row of automatic selector switches for each line group to which such lines are multiplied, a driving shaft between each vertical row of switches, two main power shafts driven from different sources, the switches located in a given vertical row being located between shafts driven one from each of said power shafts, gears on said driving shafts, pairs of switches in corresponding levels in adjacent bays being driven from the same gear.

In witness whereof, I hereunto subscribe my name this 24th day of July A. D., 1913.

FRANK ROBERT McBERTY.

Witnesses:
F. T. WOODWARD,
HENRY M. DIEDERICH.

Copies of this patent may be obtained for five cents each, by addressing the "Commissioner of Patents, Washington, D. C."